No. 790,429. PATENTED MAY 23, 1905.
A. GUTENSOHN.
PROCESS OF RECOVERING METALS AND OXIDS FROM SOLUTIONS.
APPLICATION FILED JUNE 23, 1904.
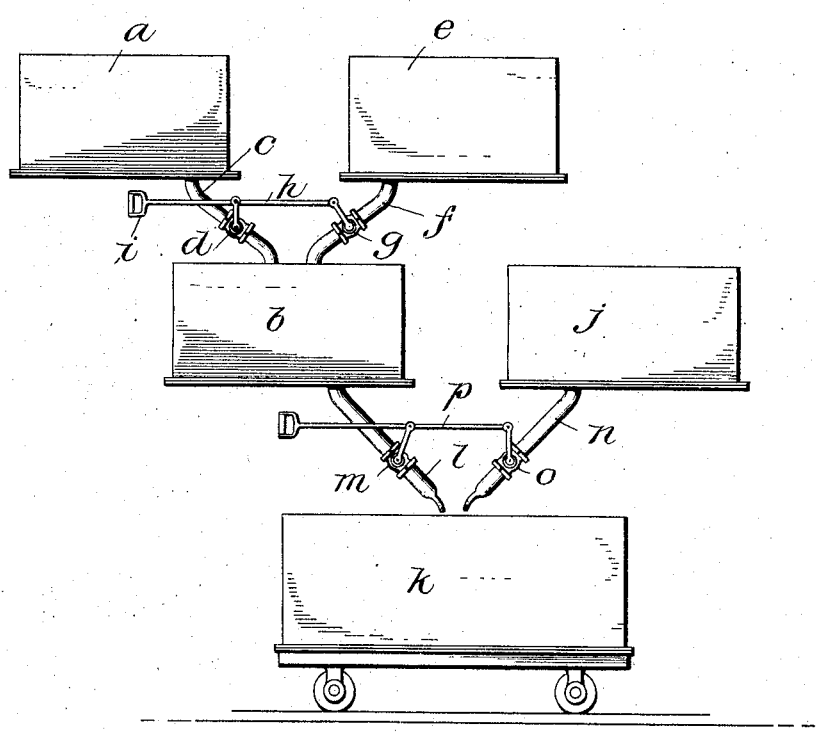

No. 790,429.

Patented May 23, 1905.

UNITED STATES PATENT OFFICE.

ADOLF GUTENSOHN, OF SOUTHEND, ENGLAND.

PROCESS OF RECOVERING METALS AND OXIDS FROM SOLUTIONS.

SPECIFICATION forming part of Letters Patent No. 790,429, dated May 23, 1905.

Application filed June 23, 1904. Serial No. 213,884.

*To all whom it may concern:*

Be it known that I, ADOLF GUTENSOHN, a subject of the King of Bavaria, residing at Southend, in the county of Essex, England, have invented new and useful Improvements in Processes of Recovering Metals and Oxids from Solutions; and I do hereby declare the following to be a full, clear, and exact description of the invention, such as will enable others skilled in the art to which it appertains to make and use the same.

This invention relates to the recovery of metals or their oxids from acid solutions in which they have been dissolved. For example, in the case of an ore, the ore, if a sulfid one, would require to be suitably roasted to bring it to a sulfate condition and sometimes require to be sulfatized and afterward dissolved in hot or cold water with or without the addition of sufficient acid to form a solution that will dissolve out of the ore the metal or oxid desired to be obtained. In the case of a metal it may only be necessary to dissolve it direct by immersion in a suitable acid solution. The solution then containing in a soluble form the metal or oxid desired to be recovered is allowed to settle and is drawn off for treatment according to this invention, which consists in slowly passing the solution into a special precipitant or adding the latter to the solution, which precipitant immediately precipitates the metal oxid, which is at once caught by an ingredient of the special precipitant, and the two, the oxid and the collecting ingredient, at once coagulate into a buoyant mass rising to the surface of the liquids, from whence it can be easily collected, and after being allowed to dry or pressed to expel the moisture it is transferred to a retort, when the collecting ingredient of the precipitant is distilled off by heating the retort, leaving the metal or oxid free within the retort for such further treatment as may be desired. The collecting ingredient as it is distilled off can be condensed and collected in its original form for reuse in making a fresh supply of the precipitant, or by reason of the refining it goes through by distillation it is salable for the manufacture of varnish at an increased price beyond its original market value. A small portion of the collecting ingredient will not distil off and is burned out by opening the retort to admit air. Insoluble metals and sulfids in the ore will sink to the bottom of the solution in which the ore is dissolved, while soluble metals other than zinc will be precipitated by the zinc if this metal is in the solution in excess of the other metals.

The advantages of this invention are: First, nearly the whole of the metal or oxid held in solution is quickly recovered at a very low cost; second, the metal and oxid obtained are of very high purity; third, in treating zinc-lead ore both the oxid of zinc and the lead are obtained entirely separated from each other; fourth, the copper obtained is quite free of iron and other impurities; fifth, no washing or chemical treatment after precipitation is required; sixth, very little and inexpensive plant is only required.

In the accompanying drawing the figure represents diagrammatically an apparatus for carrying my process into effect.

$a$ represents an earthenware or lead-lined wooden tank in which the ore after it is roasted is dissolved. This tank may be fitted with a steam-coil for heating purposes, if desired. $b$ represents a similarly-made tank which is connected with the tank $a$ by a pipe $c$, provided with a valve $d$.

$e$ represents a tank in which is contained a hot alkaline solution, preferably of caustic soda.

$f$ represents a pipe connecting the tank $e$ with the tank $b$, and this pipe is provided with a valve $g$. Preferably the operating-handles of the valves $d$ and $g$ are connected together by a rod $h$, having a handle $i$, so that when one of said handles is opened the other is closed.

$j$ represents a steam-jacketed pan or tank in which the special precipitant is made, and $k$ represents the collecting-vat, which is preferably mounted on wheels, so that one of said vats when full can be moved away and another substituted.

$l$ represents a discharge-pipe from the tank $b$, provided with a valve $m$, and $n$ represents a discharge-pipe from the pan $j$, which pipe is provided with a valve $o$. The valves $m$ and

*o* are connected together by a rod *p*, so that they may be operated together and that when one of them is open the other is closed.

All the tanks are preferably made in a similar manner to withstand the actions of acids and alkalies, and the tanks *a*, *b*, and *e* are preferably provided with steam-coils to keep the contents thereof hot. The nozzles of the discharge-pipes are preferably made flat and wide, so that a thin wide stream of the material under treatment will pass through them.

When the coagulated mass has been removed from the tank *k*, the liquid remaining in it may usually be thrown away, as it contains nothing but the excess of alkali, which it is not worth while to attempt to recover unless the working of the ore is on a very large scale. The resin is distilled from the coagulated mass in the usual way.

Having now set out the leading characteristics of my invention, I will proceed to fully describe the same and how it is to be carried into practice.

The special precipitant above referred to is made as follows: I first prepare powdered lime by exposing lime to damp air, and when it has fallen into powder it is sifted through a fine sieve to eliminate any hard silicious particles. I then melt resin, preferably in a steam-jacketed pan, and stir into it the powdered lime in the proportion of about one ounce of lime to one pound of resin. This mixture forms a resin-lime plaster which is specially adapted to take up a large portion of alkali. The more of the latter that can be taken up the greater the efficiency of the precipitant. Any excess of lime not taken up by the resin is allowed to settle down and may be removed by any suitable means. I then add the lime-resin compound to boiling water, and for every four pounds of lime-resin compound I add about ten ounces of common soda crystals or a proportionate amount of caustic or other alkali and boil the whole for at least half an hour, keeping the mass well stirred. I then add about ten ounces of caustic-alkali solution, and after a further ten minutes boiling I add gradually about thirty ounces of common soda crystals or a proportionate amount of caustic or other alkali. The quantity of water used is from three to four pounds to every pound of solid employed, and this quantity of water is to be kept up by the addition of further water from time to time as the loss by evaporation by boiling occurs. The resultant product is my special precipitant, which is preferably used hot, as made. If used cold, its action is slower and the coagulated mass will sink to the bottom of the liquid and would be obtained by straining the liquor through a strainer.

In the preparation of the above precipitant the above-stated proportions give the best results. Tar can be used in place of resin; but it does not give such good results. The soda is the precipitant of the oxid of metal from the acid solution and the resin the collecting ingredient for the precipitated oxid.

I find in practice that immediately previous to the mixing of the acid solution and the precipitant it is advantageous to add to the acid solution an additional quantity of soda in a hot solution. By this addition a less quantity of the precipitant will be used. The quantity of this additional soda to be added is from a third to a half the quantity of the soda in the precipitant. The quantity of the acid solution and the precipitant before mixing should be about equal.

Having prepared my precipitant and provided the extra supply of soda solution, I carry my invention into practice substantially in the following manner for different metals and oxids.

Zinc-lead ore: This ore is first sufficiently roasted so that the zinc sulfid, but not the lead sulfid, is sulfatized and is thus capable of extraction by boiling water or weak acid solution. The lead being insoluble sinks to the bottom of the solution free of zinc and when removed as slime is ready for the lead-smelter. Any silver in the ore will pass into the lead and can be recovered in the usual way. When the ore solution has settled, it is drawn off and when heated the additional hot soda solution is added and the solution immediately passed into the special precipitant or the latter added to it, when the metal oxid is immediately precipitated out of the solution by the soda and at the same time caught by the resin, the two, resin and oxid, rising to the surface like milk curds, which can be easily skimmed off, and is retorted, as before described.

Some zinc-lead ores when treated by this invention will give an oxid the whole of which when removed from the retort will be of sufficient purity for paint. From some ores only a portion of the oxid will be suitable for paint. The remainder can then be distilled in the usual way for spelter or oxid of zinc—that is, by sublimation.

Alumina: If an ore is under treatment for the recovery of alumina, the ore would be dissolved in a weak acid solution—say one part sulfuric acid and fifteen parts water—the solution being passed into the precipitant and the oxid obtained by distilling off the resin from the coagulated mass for subsequent treatment by smelting for the production of aliminium.

Nickel: If this ore is under treatment, it would be dissolved in a weak acid solution—say one part sulfuric acid and fifteen parts water—and the solution then treated by the precipitant as for zinc, the result being that from the coagulated mass which comes to the surface the metal in a very fine state of division will be left free in the retort when the resin has been distilled off. This finely-divided metal is then removed, when it can be smelted.

Tin: This ore is to be treated as for nickel, the acid of the acid solution being hydrochloric.

Copper: The sulfate of copper is dissolved in hot water with or without a small quantity of acid and the solution added to the precipitant and the collected coagulated mass treated to distil off the resin, when the metal will be left free in the retort in a state of very fine division which can be easily smelted.

Recovery of metals from plated metal or materials and oxid from zinc cuttings: The plated metal or cuttings will be immersed in an acid solution suitable to dissolve off the plating or cuttings. The solution for zinc and nickel would be a weak one of sulfuric acid—say one part acid to twenty parts water; for tin, a weak solution of hydrochloric acid—say one part acid and ten parts water; for silver, a solution of nitric acid—say one part acid and fifteen parts water, the process for the recovery of the oxid or metal being as before described.

The form of retorts to be used for distilling off the resin will be of the usual kind for such a purpose, so do not require any special description.

The appliances for use of this invention consist of a usual form of steam-jacketed pan for preparing the precipitant and simple vats for the solutions, preferred to be made of wood lined with lead. These are so placed that the contents of one can be run into another by gravitation, and it is preferred, but is not essential, that the acid solution and the precipitant should be mixed by being run out of nozzles simultaneously in thin flat streams, the nozzles being so placed that the two streams collide at their exit and fall into a collecting-tank. For the purpose of heating the solutions in the vats the latter would be internally fitted with a steam-coil in communication with a suitable supply of steam. When the coagulated mass has been removed, the liquor remaining in the tank will only contain the alkali, which by having absorbed the acid from the metal solution will become sulfate of soda. This can be treated in the usual way to extract the acid and so change the sulfate of soda to a condition that it can be used over again for making the soda solution or the precipitant.

Having described my invention, what I desire to claim is—

1. The process of recovering metals and oxids from solutions which consists in mixing the solution containing said metallic bodies with a solution composed of an alkali and resin, separating the liquid from the coagulated mass and then retorting the latter to drive off the resin, substantially as described.

2. The process of recovering metals and oxids from solutions containing the same, which consists in mixing said solutions with an alkaline solution, mixing the product with a solution containing alkali and resin, withdrawing the coagulated mass, separating the mixture therefrom and retorting the same to distil off the resin, substantially as described.

ADOLF GUTENSOHN.

Witnesses:
A. NUTTING,
H. D. JAMESON.